United States Patent [19]

Williams

[11] Patent Number: 4,854,373
[45] Date of Patent: Aug. 8, 1989

[54] HEAT EXCHANGER FOR A PUMP MOTOR

[76] Inventor: Gordon G. Williams, 5291 Georgia Hwy. 3, Space No. 3, Hampton, Ga. 30228

[21] Appl. No.: 302,568

[22] Filed: Jan. 26, 1989

Related U.S. Application Data

[62] Division of Ser. No. 175,198, Mar. 30, 1988.

[51] Int. Cl.$^4$ .......................... F28F 7/00; H02K 9/00; H02K 9/02; F04B 17/00
[52] U.S. Cl. ........................................ 165/46; 165/47; 165/77; 165/86; 165/169; 310/54; 310/64; 417/366; 417/370
[58] Field of Search ....................... 165/46, 47, 86, 77, 165/169; 310/54, 64; 417/366, 369, 370

[56] References Cited

U.S. PATENT DOCUMENTS

| | | | |
|---|---|---|---|
| 1,925,032 | 8/1933 | Dunner | 165/86 |
| 2,136,626 | 11/1938 | Lind | 165/86 |
| 2,419,159 | 4/1947 | Pezzillo . | |
| 2,625,804 | 1/1953 | Patch et al. | 165/77 |
| 2,683,823 | 7/1954 | Cunningham . | |
| 3,127,530 | 3/1964 | White | 417/366 |
| 3,286,712 | 11/1966 | Roden . | |
| 3,371,613 | 3/1968 | Dahlgreen et al. | 310/54 |
| 4,213,498 | 7/1980 | Vandenbussche | 165/46 |
| 4,500,772 | 2/1985 | Ahner et al. | 310/63 |
| 4,516,044 | 5/1985 | Bone | 310/54 |
| 4,729,425 | 3/1988 | Mitchell | 165/47 |

FOREIGN PATENT DOCUMENTS

| | | | |
|---|---|---|---|
| 2487760 | 2/1982 | France | 165/46 |
| 874748 | 8/1961 | United Kingdom | 310/54 |

*Primary Examiner*—John Ford
*Attorney, Agent, or Firm*—Hurt, Richardson, Garner, Todd & Cadenhead

[57] ABSTRACT

A crescent shaped exchanger tank is fitted over the top portion of an electric motor which drives a centrifugal pump. The inlet to the pump is connected to a drain on a bath tub and the discharge of the pump is connected to jet nozzles along the sides of the tub. The heat exchanger has an inlet connected to the high pressure side of the pump and a discharge connected to low pressure or suction side of the pump. The heat of the motor heats the water circulated in the tank to warm the water delivered through the jet nozzles to the tub.

6 Claims, 3 Drawing Sheets

HEAT EXCHANGER FOR A PUMP MOTOR

This is a divisional of co-pending application Ser. No. 175,198 filed on 3/3/88.

BRIEF SUMMARY OF THE INVENTION

This invention relates to a tub assembly and is more particularly concerned with a heating system for reheating water in a tub.

In the past, tubs which are provided with jet nozzles have been devised for providing circulating water to the tub. Such a circulating system includes a motor with a centrifugal pump which takes a suction from the bottom portion of the tub and delivers the water through an electrical heat exchanger to the discharge nozzles in the tub for directing the water against a person occupying the tub. Usually, the water in the tub has been delivered to the tub at the appropriate temperature from the hot water system in a house and the purpose of the heater is to maintain the water in the tub in an appropriately heated condition. Such heaters have usually been electrical heaters which are arranged in series with the pump, the electrical heater being connected to an appropriate source of electricity. These heaters have heating elements which wear out and have electrical wires which may become grounded, due to the moist condition in close proximity to the electrical heater. Such electrical heaters are expensive to manufacture and require careful installation by skilled mechanics in order to protect a prospective occupant of the tub from electrical shock, also, adequate controls must be provided for the heater to insure that the water is not overheated by the electrical heater.

In the past, motors have been devised which serve a double function of heating fluid and also circulating the heated fluid through a fluid system. One such system is disclosed in the U.S. Pat. to Pezzillo No. 2,419,159, in which water is passed through a motor for heating a boiler. The motor serves a double function of heating the fluid and also circulating the heated fluid through the system. Apparently, in the Pezzillo Patent, the heat is generated by the rotor of the motor.

In the U.S. Pat. to Cunningham, et al. No. 2,683,823, a motor with a jacket around the motor is disclosed. Water is fed through this jacket for the purpose of cooling the motor. Steam generated by the water is released into the motor in order to provide a further cooling and then, the steam is released to the atmosphere. U.S. Pat. to White, No. 2,127,530 discloses a motor which has a coil for cooling the motor. The motor also has a pump and apparently, the coil provides a cooling system for the motor. The water for this cooling is obtained from the pump.

In the U.S. Pat. to Ahner, No. 4,500,772, a motor is disclosed which has ducts through which cooling air is circulated over the coils and the rotor for cooling them. The cooling fluid is then made available for heating the passenger compartment of a vehicle.

Briefly described, the present invention includes a tub, into which is introduced heated water from an external source. The water in the tub is circulated from and to the tub through conduits by a centrifugal pump which is normally disposed below the level of the water in the tub. This centrifugal pump draws water from the bottom portion of the tub and directs it through spaced jet nozzles disposed in the sides of the tub. An electric motor drives the centrifugal pump and a heat exchanger encompasses the upper portion of the body or casing of the motor. The heat exchanger is concaved so as to overlie the convexed upper portion of the motor and heat exchanger having a hollow interior with baffles for forming a tortuous passageway through which the water is passed to be heated by the heat from the motor. Water is introduced into this heat exchanger through an intake tube, pipe or conduit connected to the high pressure side of the pump and is discharge back into the pump through a discharge tube, pipe or conduit connected to the low pressure side of the pump. The two tubes, pipes or conduits which supply the water and return the water to the pump are connected at the lowest points at opposite sides of the curvilinear, crescent shaped heat exchanger and feed downwardly to low positions in the pump.

Accordingly, it is an object of the present invention to provide a tub assembly which is inexpensive to manufacture, durable in structure and efficient in operation.

Another object of the present invention is to provide a heat exchanger for a bath which is self draining.

Another object of the present inventon is to provide a heating system for a bath tub which will eliminate the necessity for an electrical heater and which will maintain the appropriate temperature of water in a tub over an extended period of time.

Another object of the present invention is to provide a heating system for a bath tub which is easy to install and which will readily and inexpensively adapt a conventional pump and motor assembly so that it will reheat the water recirculated to the tub and will also cool the electrical motor.

Another object of the present invention is to provide a heating system for a hot tub which has no moving parts and which can be readily and easily adapted to a conventional motor on a tub water circulating system.

Another object of the present invention is to provide a cooling system for a motor which drives the pump for circulating the water in the tub.

Another object of the present invention is to provide a heating system for tub which will not readily or easily overheat.

Other objects features and advantages of the present invention will become apparent from the following description when taken conjunction with the accompanying drawings wherein like characters of reference designate corresponding parts.

DETAILED DESCRIPTION

Figure 1:
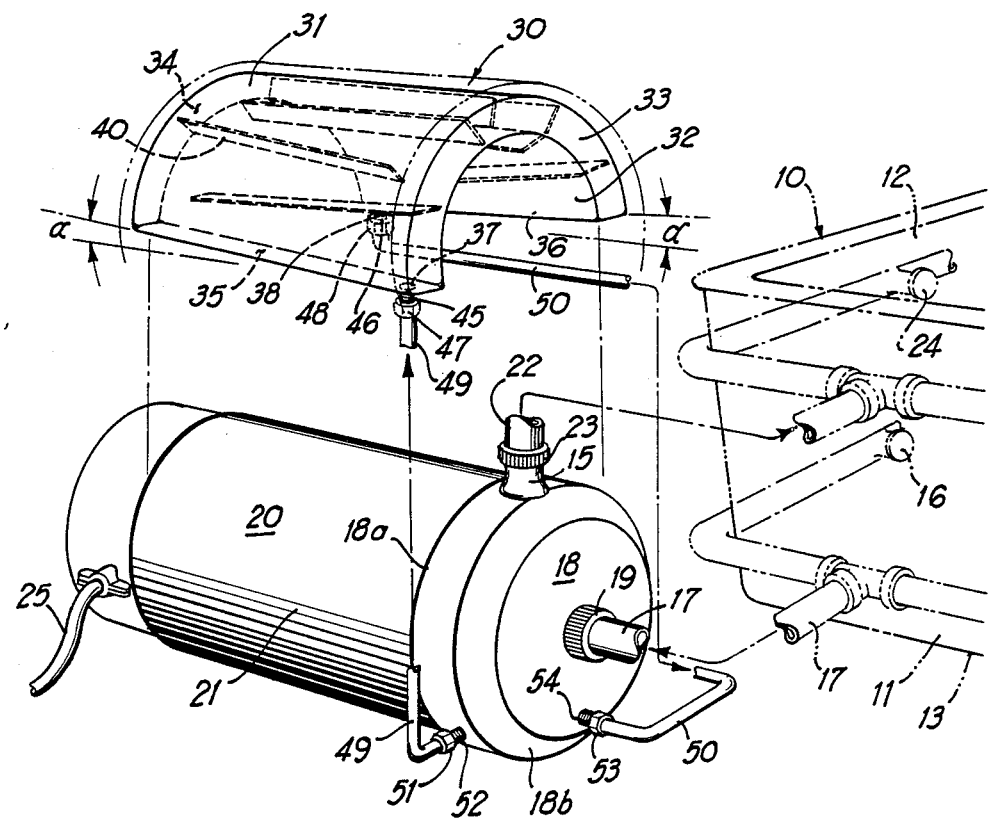
FIG. 1 is an exploded perspective view of the tub assembly of the present invention, the pump thereof being connected to the nozzles and to the drain port of a conventional tub shown in broken lines.
Figure 2:
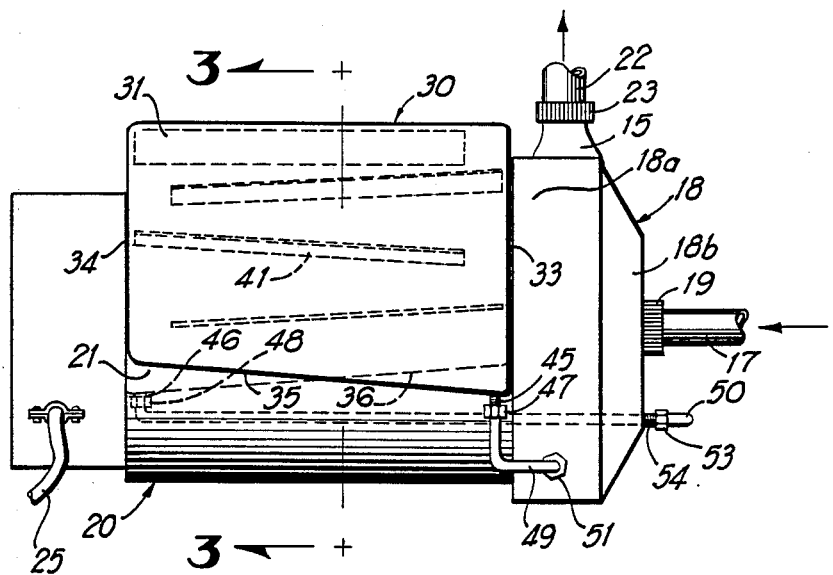
FIG. 2 is a side elevational view of one side of the pump, motor and heat exchanger of the tub assembly shown in FIG. 1.
Figure 3:
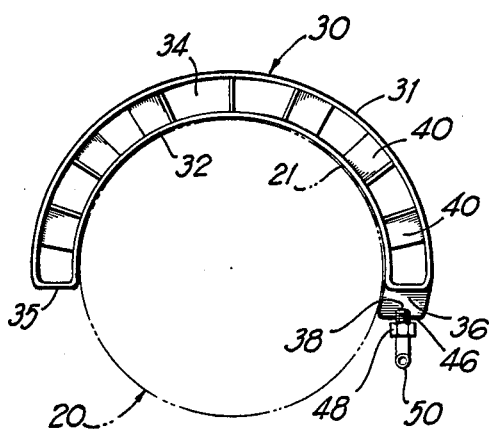
FIG. 3 is a cross-sectional view taken substantially along line 3—3 in FIG. 2.

Referring now in detail to the embodiments chosen for the purpose of illustrating the present invention, numeral 10 in FIG. 1 denotes generally a conventional tub which has an end 11 and a pair of spaced, opposed sides, such as side 12, and a bottom 13 provided with a drain 14. Heated water from an external source (not shown) is introduced into the tub 10 and can be drained from the tub through drain 14 when the tub 10 is no longer in use. A primary water circulating system for the tub 10 includes a water intake port 16 located in one of the sides 12 adjacent to the bottom 13. A conduit, such as pipe or tube 17, leads from the water intake or recirculator port 16 to the intake side of a centrifugal pump 18 which is externally of tub 10. A coupling 19 on the centrifugal pump 18 secures the pipe 17 in place.

A motor 20, externally of the tub 10, having a casing or housing 21 drives the impeller (not shown) of the water pump 18 so that when this impeller is rotated, water will be drawn into the low pressure or suction side 18b of the pump 18 from pipe 17 and passed into the high pressure side 18a so as to be discharged through a discharge spour 15 into a discharge pipe 22. The discharge pipe 22 is secured to the spour 15 by a threaded collar 23. The discharge pipe 22 leads to and communicates with a plurality of discharge ports formed by jet nozzles 24 which are mounted in the sides 12 of the tub 10, these jet nozzles 24 being in spaced opposed relationship so that streams of water emerging from the jet nozzles 24 are directed inwardly toward a person in the tub 10. These nozzles 24 are normally located below the waterline in the tub 10 and are above both the drain 14 and the drain port 16.

The motor 21 is electrically connected to a source of electricity by a cable 25. Mounted on the upper convex portion of the housing, casing or body 21 of motor 20 is a crescent shaped, semi-cylindrical heat exchanger, denoted generally by the numeral 30. This heat exchanger 30 is formed of sheet metal and defines a chamber into which water to be heated is introduced. In more detail, the heat exchanger 30 includes an outer wall 31 which is convexed along its outer surface and concaved along its inner surface. The curvature of the outer wall 31 is generally about a horizontal axis.

Inwardly of the concaved outer wall 31 is an inner wall 32 which is spaced inwardly of the outer wall 31 and is concentric therewith, the inner wall 32 being concaved along its lower or outer surface and convexed along its inner surface. The ends of the walls 31 and 32 are joined by crescent shaped end plates 33 and 34 and the bottom edges of the walls 31 and 32 are joined by rectangular bottom plates 35 and 36. These bottom plates 35 and 36 are respectively inclined in opposite directions, being inclined at angle $\alpha$ with respect to a horizontal plane passing through the longitudinal axis. This inclination of the plates 35 and 36 is from about 2° to about 15° to the horizontal so that the water within the heat exchanger 30 will drain toward the ports or holes 37 and 38, respectively. Walls 31 and 32, end plates 33 and 34, and bottom plates 35 and 36 define a closed chamber, except for the ports 37 and 38, so that water can be introduced into the closed chamber through either port 38 or 37 and be discharged from the other port.

Within the chamber defined by the walls 31 and 32 are spaced, parallel, baffles which are arranged either axially in radially spaced relationship to each other or radially in axially spaced relationship to each other. These baffles are so arranged as to provide connected successive passageways for the travel of water through the heat exchanger 30. In one embodiment, the baffles 40 are disposed axially so that each alternate baffle is connected to one end plate 34 and is spaced from the other end plate 35 and vice-versa. These baffles 40 are inclined slightly so as to permit water to drain from the top along the connected passageways, toward both of the bottom plates 35 and 36 and thence drain toward and out of the ports 37 and 38, respectively.

The heat exchanger 30 subtends approximately slightly more than 180° along its inside surface of inner plate 32 and is sufficiently resilient that it can be snapped into place over the rounded top portion of the motor 20. Since the ends, adjacent to the ports 37 and 38 are lower than the corners of the heat exchanger, at diagonally opposite ends of the plates 35 and 36, the arc subtended by the plate 32, when viewed transversely is greater than 180°. Since the diameter of the plate 32 is approximately equal to the diameter of the motor housing 21, the heat exchanger 30 can be urged or forced onto the upper exposed exterior portion of this housing 21, the heat exchanger 30 flexing or deforming slightly outwardly, within its elastic limits and then returning to about its original shape as the heat exchanger 30 is fully seated on the upper surface of the housing 21. Thus, the heat exchanger 30 will snap into place and will not readily be removed from the motor 20. This feature also assures that the plate 32, which is concentric with the surface of motor 21 will be seated and held in place firmly against the upper surface of the housing 21. If desired, heat transfer mastic or adhesive can be employed to adhere plate 32 to the housing 21. Thus, the heat exchanger 30 should be instaled prior to the time that any conduits, such as tubes 49 and 50 are installed.

Ports 37 and 38 are respectively provided with externally threaded, downwardly protruding nipples 45 and 46 which receive the internally threaded couplings 47 and 48 on the ends of water conduits, such as the tubes 49 and 50, respectively. The water supply tube 49 is provided with a second coupling 51, the coupling 51, in turn being threadedly received on a nipple 52 which protrudes from the periphery of the high pressure side 18a of the centrifugal pump 18. Nipple 52 communicating with the interior of the high pressure side of 18a. The tube 50 is connected to a coupling 53 which is threadedly received on a nipple 54 which communicates with the bottom portion of the low pressure side 18b of the pump. The nipples 52 and 54 are both located toward the bottom portion of the pump 18 so that tubes 49 and 50 provide a drop from the plates 35 and 36 for the water to drain from both sides of the heat exchanger 30 into pump 18 whenever the pump 18 is stopped. The nipple 52 is disposed along the periphery of the high pressure side 18a so that the water will be pumped by the impeller (not shown) of the centrifugal pump 18 up through the tube 49 to fill the heat exchanger 30 and thence pass downwardly through the tube 50, to return to the low pressure or suction side 18b of the pump 18 for recirculation to the high pressure side 18a.

The motor 30 normally heats to about 170° F. to about 180° F. during operation and thus generates heat which will be transferred by conduction via housing 21 through the plate 32 to heat the water in the heat exchanger 30. Since the tube 49 is connected to the high pressure side 18a of the centrifugal pump 18, water will be delivered through this tube 49 into the heat exchanger 30 and thence into the tube 50 and back to the low pressure side 18b of the heat exchanger 18 whenever the motor 20 and its pump 18 are operated. This circulation of the water is automatic. Furthermore, whenever the pump 18 is shut down, the water will tend to drain from the heat exchanger 30 and pump 18, through the pipe 17 back into the tub 10, passing through port 16. Thus, there will be no appreciable water in the heat exchanger 30 when the pump 18 is not in operation. This is a desirable feature since it will assure that the relatively warm heat exchanger 30 will not appreciably promote the growth of bacteria and slime in the heat exchanger.

The baffles 40 will create a tortuous passageway for the water back and forth through the heat exchanger 30 when the pump 18 is operating. This will assure that there is adequate area to area contact between the water and the heat exchanger body so that there is a substantial transfer of heat from the motor 20 to the heat exchanger 30. This transfer of heat is sufficient, as a general rule, to maintain the temperature of the water in the hot tub at an appropriate level such as approximately 104°.

Figure 4:
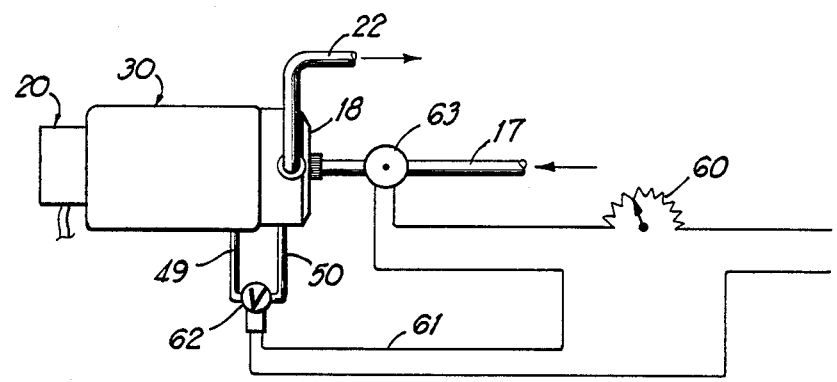
FIG. 4 is schematic diagram of the electric-mechanical system of the present invention.

It may be desirable, however, to provide a timer, such as timer 60 seen in FIG. 4. This time 60 should be installed in a series, in a circuit 61 of from a osurce of electricity to the control means, such as a guillotine type solenoid valve 62, in either the intake tube 49 or the return tube 50. This solenoid valve 62 is opened and closed or partially closed by circuit 62 which includes a thermostat 63 so that when the water is heated sufficiently, the solenoid valve 70 will be closed or partially closed to prevent or retard the circulation of water to the heat exchanger 30 until the temperature of the tub 10 has dropped. Timer 60 is manually set and will determine when the valve 70 is operative.

Figure 5:
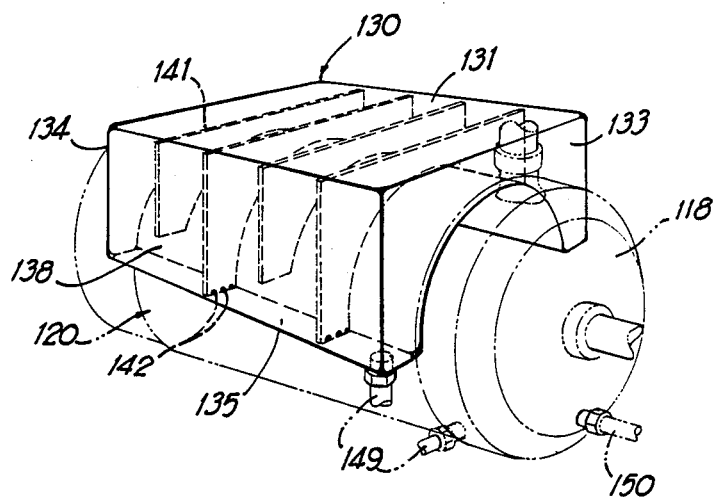
FIG. 5 is a schematic perspective view of a modified heat exchanger of the present invention.

In the modified embodiment illustrated in FIG. 5, the motor 120 is provided with heat exchanger 130 received on the arcuate upper surface of the motor. Motor 120 drives the pump 118 for circulating water to a tub in manner identical to the circulation of the water by pump 18. According to the present embodiment, the heat exchanger 130 has a flat outer wall 131 but an arcuate inner wall 132 which fits and is concentric with the upper surface of the housing of motor 120. In this embodiment, the bottom plates such as plate 135 are inclined toward their conduit or tube such as tube 149 so that the heat exchanger 130 will drain in a manner described for heat exchanger 30. This heat exchanger 130 has end plates 133 and 134 as well as side plates such as plate 138. The plates 131, 132, 133, 134, 135 and 138 define a closed chamber within which are disposed a plurality of radially extending longitudinally spaced baffles 141 which have drain holes 142. The baffles 141 form a passageway from tube 149 so as to pass the water successively over the top portion of motor 120 and discharge the water as illustrated for the heat exchanger 30.

It will be obvious to those skilled in the art that many variations may be mde in the embodiment here chosen for the purpose of illustrating the present invention without departing from the scope thereof as defined by the appended claims.

I claim:

1. A heat exchanger for a motor of the type having a concaved upper surface, said heat exchanger comprising:
a housing having a hollow interior said housing having an inner surface which conforms to the shape of said motor and subtends slightly more than 180° so that said heat exchanger will snap onto the upper surface of said motor, said heat exchanger deforming slightly as it passes the mid portion of said motor and said housing having means for connecting said heat exchanger to a source of heat transfer fluid.

2. A heat exchanger for being mounted in a heat exchanging relationship to the concaved upper surface of a motor disposed along a generally horizontal axis, comprising: an inner wall conforming generally to the shape of said motor, an outer wall in spaced relationship to said inner wall and means for closing the edge portions of said inner wall and outer wall for forming a chamber therebetween, and endplates at the bottom portions of said inner wall for closing said chamber, said endplates being disposed at an angle from said general horizontal axis when said heat exchanger is mounted on said motor, whereby said chamber will drain water therefrom along said bottom plates, and means for connecting said heat exchanger to a source of water.

3. The heat exchanger defined in claim 2 including spaced baffles within said chamber for forming successively connected passageways.

4. The heat exchanger defined in claim 3 wherein said baffles are disposed in longitudinally spaced radial planes.

5. The heat exchanger defined in claim 2 wherein said baffles extend generally in an axial direction and are circumferentially spaced from each other.

6. The heat exchanger defined in claim 2 wherein said inner wall subtends slightly more than 180° so that said heat exchanger can be snapped onto the upper surface of said motor.

* * * * *